United States Patent
Abdkader et al.

(10) Patent No.: US 12,060,660 B2
(45) Date of Patent: Aug. 13, 2024

(54) WINDING AND TWISTING DEVICE FOR A RING SPINNING OR RING TWISTING MACHINE

(71) Applicant: SANKO TEKSTIL ISLETMELERI SANAYI VE TICARET ANONIM SIRKETI, Gaziantep (TR)

(72) Inventors: Anwar Abdkader, Freital (DE); Mahmud Hossain, Dresden (DE); Martin Waldmann, Dresden (DE); Chokri Cherif, Dresden (DE)

(73) Assignee: SANKO TEKSTIL ISLETMELERI SANAYI VE TICARET ANONIM SIRKETI, Gaziantep (TR)

( * ) Notice: Subject to any disclaimer, the term of this patent is extended or adjusted under 35 U.S.C. 154(b) by 106 days.

(21) Appl. No.: 17/904,276

(22) PCT Filed: Feb. 18, 2021

(86) PCT No.: PCT/EP2021/053981
§ 371 (c)(1),
(2) Date: Aug. 15, 2022

(87) PCT Pub. No.: WO2021/165374
PCT Pub. Date: Aug. 26, 2021

(65) Prior Publication Data
US 2023/0079829 A1    Mar. 16, 2023

(30) Foreign Application Priority Data
Feb. 20, 2020    (EP) .................................... 20158383

(51) Int. Cl.
*D01H 7/58*    (2006.01)

(52) U.S. Cl.
CPC .................................... *D01H 7/58* (2013.01)

(58) Field of Classification Search
CPC .......... D01H 7/585; D01H 7/60; D01H 7/602; D01H 7/604; D01H 7/52; D01H 7/02; D01H 7/00; D01H 7/58
(Continued)

(56) References Cited

U.S. PATENT DOCUMENTS 547,937  A  * 10/1895  Peirce ...................... D01H 7/60
                                                      57/119
660,631  A  * 10/1900  Edwards .................. D01H 7/56
                                                      57/124
(Continued)

FOREIGN PATENT DOCUMENTS

CN    101429692 A    5/2009
CN    103820894 B    5/2016
(Continued)

OTHER PUBLICATIONS

European Patent Office, Extended European Search Report Issued in Application No. 20158383.8, Aug. 17, 2020, Germany, 6 pages.
(Continued)

*Primary Examiner* — Bao-Thieu L Nguyen
(74) *Attorney, Agent, or Firm* — McCoy Russell LLP (57) ABSTRACT

The present invention provides a winding and twisting device for a ring spinning or ring twisting machine, comprising: a stator comprising a superconducting material, a stator cooling device, a rotor configured to generate a magnetic field, and a rotatable spindle, wherein the rotor and the stator are arranged co-axially to the spindle, and wherein the rotor has a ring/traveler system mounted thereon.

15 Claims, 6 Drawing Sheets

(58) Field of Classification Search
USPC .......................................... 57/119, 122, 124
See application file for complete search history.

(56) References Cited

U.S. PATENT DOCUMENTS

| | | | | | |
|---|---|---|---|---|---|
| 843,810 | A * | 2/1907 | Hayden | .................. | D01H 7/602 57/307 |
| 1,595,858 | A * | 8/1926 | Crompton | ................ | D01H 7/60 57/119 |
| 1,689,128 | A * | 10/1928 | Gilligan | .................. | D01H 7/602 57/121 |
| 1,834,874 | A * | 12/1931 | Schaaff | .................. | D01H 7/604 57/125 |
| 2,057,716 | A * | 10/1936 | Foster | .................... | D01H 7/604 57/118 |
| 2,141,754 | A * | 12/1938 | Kohler | ..................... | D01H 7/62 384/402 |
| 2,563,187 | A * | 8/1951 | Pennati | .................... | D01H 7/58 57/124 |
| 2,748,559 | A * | 6/1956 | Arthur | ..................... | D01H 7/60 57/119 |
| 2,952,965 | A * | 9/1960 | Binns | ........................ | D01H 7/60 57/299 |
| 2,970,425 | A * | 2/1961 | Foard | ..................... | D01H 7/602 57/119 |
| 3,011,301 | A * | 12/1961 | Grishin | ................... | D01H 7/60 57/119 |
| 3,025,660 | A * | 3/1962 | Gonsalves | .............. | D02J 1/225 57/352 |
| 3,036,422 | A * | 5/1962 | Stahli | ..................... | H01J 29/07 57/119 |
| 3,081,593 | A * | 3/1963 | Meerdink | ............... | D02J 1/229 57/313 |
| 3,093,957 | A * | 6/1963 | Tetreault | ................ | D01H 7/602 57/122 |
| 3,114,234 | A * | 12/1963 | Kobayashi | .............. | D01H 7/52 57/124 |
| 3,122,876 | A * | 3/1964 | Matsui | ................. | F16C 32/0429 57/124 |
| 3,205,647 | A * | 9/1965 | Matsui | ................. | F16C 32/0429 57/124 |
| 3,323,300 | A * | 6/1967 | Chilpan | ................... | D01H 7/60 57/119 |
| 3,352,096 | A * | 11/1967 | Grishin | ................... | D01H 7/60 57/119 |
| 3,354,628 | A * | 11/1967 | Chilpan | ................... | D01H 7/60 57/119 |
| 3,494,120 | A * | 2/1970 | Chilpan | ................... | D01H 7/58 57/88 |
| 3,785,140 | A * | 1/1974 | Muller | ..................... | D01H 7/58 57/119 |
| 3,851,448 | A * | 12/1974 | Sano | ....................... | D01H 7/565 57/75 |
| 3,996,732 | A * | 12/1976 | Foster | ..................... | D01H 7/64 57/120 |
| 4,114,359 | A * | 9/1978 | Creus | ....................... | D01H 7/58 57/104 |
| 4,387,556 | A * | 6/1983 | Studtmann | ............... | D01H 7/16 242/597 |
| 5,631,617 | A * | 5/1997 | Morishita | ............... | B60L 13/10 104/285 |
| 5,719,455 | A * | 2/1998 | Higasa | .................. | F16C 37/005 310/90.5 |
| 5,829,239 | A * | 11/1998 | Iwama | ..................... | D01H 7/60 57/119 |
| 6,047,533 | A * | 4/2000 | Iwama | ..................... | D01H 7/52 57/119 |
| 10,767,285 | B2 * | 9/2020 | De Haas | ................... | D01H 7/52 |
| 11,639,563 | B2 * | 5/2023 | De Haas | ................... | D01H 7/52 57/75 |
| 11,753,749 | B2 * | 9/2023 | Kueppers | ................. | D01H 7/56 57/264 |
| 2019/0127892 | A1 * | 5/2019 | De Haas | ................... | D01H 7/52 |
| 2020/0362481 | A1 * | 11/2020 | De Haas | ................... | D01H 7/52 |
| 2022/0235494 | A1 * | 7/2022 | Kueppers | ................. | D01H 7/64 |

FOREIGN PATENT DOCUMENTS

| | | | |
|---|---|---|---|
| EP | 0359460 | A1 | 3/1990 |
| JP | 661152835 | A | 7/1986 |
| JP | H01156524 | A | 6/1989 |
| JP | H02074633 | A | 3/1990 |
| JP | 102175931 | A | 7/1990 |
| WO | 2012100964 | A2 | 8/2012 |
| WO | 2012100964 | A3 | 8/2012 |
| WO | WO-2017178196 | A1 * | 10/2017 ............... D01H 7/52 |

OTHER PUBLICATIONS

ISA European Patent Office, International Search Report and Written Opinion Issued in Application No. PCT/EP2021/053981, Apr. 23, 2021, WIPO, 14 pages.

* cited by examiner

WINDING AND TWISTING DEVICE FOR A RING SPINNING OR RING TWISTING MACHINE

CROSS REFERENCE TO RELATED APPLICATIONS

The present application is a U.S. National Phase of International Application No. PCT/EP2021/053981 entitled "WINDING AND TWISTING DEVICE FOR A RING SPINNING OR RING TWISTING MACHINE," and filed on Feb. 18, 2021. International Application No. PCT/EP2021/053981 claims priority to European Patent Application No. 20158383.8 filed on Feb. 20, 2020. The entire contents of each of the above-listed applications are hereby incorporated by reference for all purposes.

TECHNICAL FIELD

The invention relates to a device for producing and winding-up of yarns in ring spinning and ring twisting machines, wherein the yarn is made rotate by a twisting element and wound up onto the bobbin due to a velocity difference to the spindle and bobbin.

BACKGROUND AND SUMMARY

Figure 1:
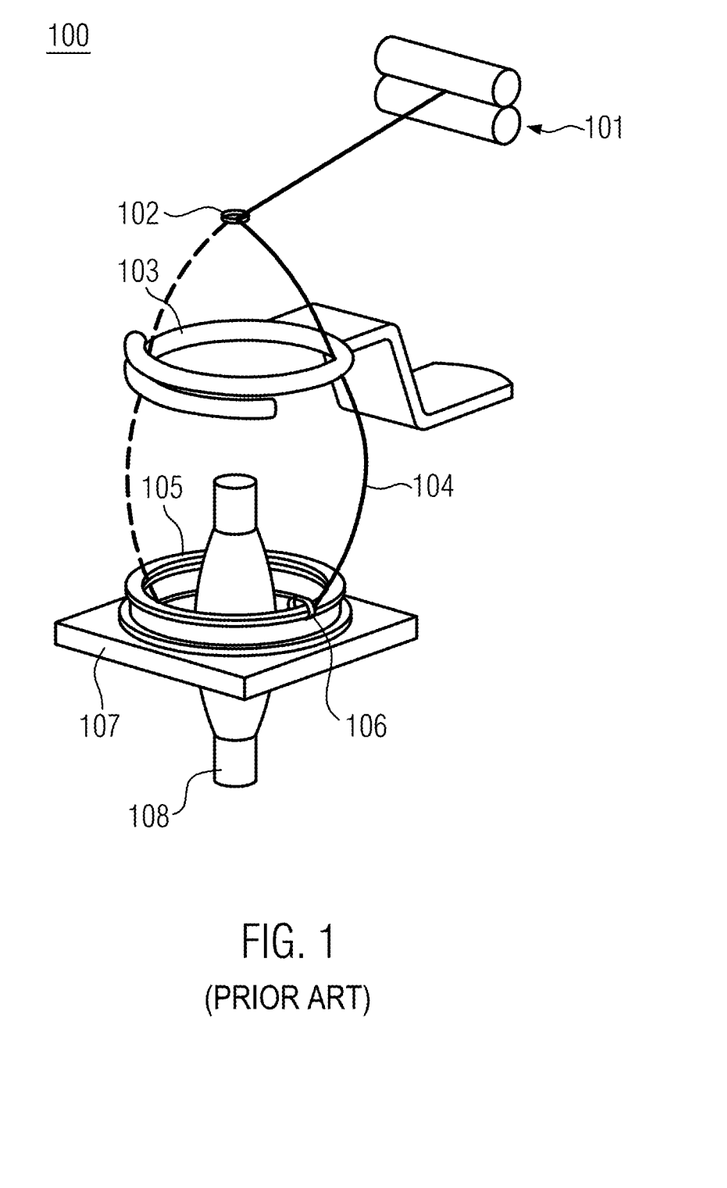
FIG. 1 shows a schematic three-dimensional view of a conventional ring spinning system.

In a conventional ring spinning process, the drafted roving is delivered into the ring/traveler system in order to twist the yarn and wind it on a bobbin. FIG. 1 shows a schematic view of a conventional ring spinning device 100.

The drafted roving is delivered by means of delivery rollers 101 through the yarn guide 102 and down to the spindle assembly where it is threaded through a small ring called the traveler 106. Between the yarn guide and the traveler, the yarn passes through a balloon control ring 103 that limits the size of the yarn balloon 104 during operation of the ring spinning machine.

The attenuated fibers are held together by the insertion of twist to form a continuous strand, i.e. the yarn, in order to impart tensile strength. The traveler 106 has no drive of its own. It is dragged along by the rotation of the spindle 108, driven by a corresponding spindle drive motor, via the yarn attached to it. Each circulation of the traveler along the ring 105 in the ring/traveler system inserts twist in the yarn. The circulation of the traveler lags somewhat behind the rotation of the spindle 108 due to the relatively high friction of the traveler on the ring and the air resistance of the yarn between yarn guide and traveler. The difference in speed between the spindle and the traveler results in winding the yarn onto the cop or bobbin that is fixed on the spindle.

A stationary ring 105, in terms of rotation, is provided around the spindle 108 to hold the traveler 106. The ring 105 is typically mounted on a vertically displaceable ring rail 107 wherein an up and down movement of the ring rail determines the shape of the yarn package threaded onto the bobbin. Ringspun yarns are generally high quality yarns and are mostly produced for the entire yarn count range from 10 tex to 100 tex.

Although the winding rates of yarn depend on the spindle speed, they are directly correlated with the speed of the traveler along the ring, which therefore limits the productivity of ring spinning. The friction as well as the wear between ring and traveler increase sharply at higher spindle speed. During spinning, high contact pressure occurs between ring and traveler. This pressure includes strong frictional forces, which in turn generate heat. This heat has to be dissipated at a fast rate to avoid fast wearing out of the ring/traveler system. The low mass of the traveler does not permit dissipation of the generated heat in the short time available, which results in a substantial wear of traveler and ring. This is detrimental to the process, particularly when spinning medium- and high-twist cotton and blended yarns in medium and fine counts.

A significant limitation of productivity in ring spinning is caused by the acting forces among the ring, traveler and yarn, mainly in the ring/traveler system. The important limiting factors can be summarized as follows:

the frictional heat between traveler and ring (melting points in man-made fibers);

the wear of the ring/traveler system, especially of the traveler.

The limitation of the speed of the traveler means that the delivery speed of the thread cannot be increased any further so that the existing ring/traveler-system limits the capacity of ring spinning and ring twisting machines.

From WO 2012/100964, a winding and twisting device of a ring spinning or ring twisting machine is known, in which the friction between the ring and the traveler is eliminated by magnetic levitation, which extends the lifespan significantly and reduces the impacting forces. A ring-shaped stator with a superconducting material and a stator cooling device is arranged co-axially to the bobbin in the same way as a ring-shaped rotor, which can be rotated in relation to the stator and creates a magnetic field, wherein the rotor has a loop-shaped yarn guiding element. When the superconducting material of the stator cools down below the transition temperature, the magnetic flux of the rotor that has entered the stator is frozen so that an inherently stable, passive support of the rotor, which has initially been supported mechanically, can be achieved by means of magnetic levitation. Due to the contactless support of the rotating rotor, the ring of the traditional ring/traveler-system may be omitted as a significant component that limits productivity due to its creation of friction heat. Instead, the entire rotor with the yarn-guiding element is now made rotate fast, wherein the rotation is essentially friction-free—with the exception of a weak magnetic friction and the air resistance—and therefore allows for significantly higher spindle speeds.

The rotor formed as a magnet ring, however, has a considerable dead weight that has to be accelerated during start-up of the spindle. Eventually, the yarn guiding element installed on the magnet ring constitutes an imbalance that may become problematic depending on the speed of the spindle.

Although the winding and twisting device described in WO 2012/100964 can eliminate the frictional problem of the existing ring/traveler twisting system, it still has several limitations:

Piecing of the yarn is not possible during the acceleration phase of the spinning process as in the conventional ring spinning devices. Compared to a conventional traveler that has a mass of a few milligrams, the mass of the rotor of the winding and twisting device of WO 2012/100964 is much higher. Due to its higher moment of inertia, the rotor requires much more time to adjust to an acceleration of the spindle. To compensate for this, a slower ramp setting of the spindle can be selected to adjust to that of the rotor. However, such a setting prolongs the piecing time and therefore, increases the total downtime of the machine for yarn piecing which in turn reduces the productivity of the ring spinning or ring twisting machine.

In case of yarn breakages at any spindle position, the whole machine implementing the winding and twisting device of WO 2012/100964 has to be stopped for the piecing of yarn. Alternatively, each spindle could be driven with a dedicated drive motor, which would, however, significantly increase the installation and operation cost of the ring spinning machine.

The present invention is consequently based on the purpose of providing a winding and twisting device for a ring spinning or ring twisting machine, which enables a fast start-up of the machine at a high capacity and which in addition reduces the installation and operation costs. In very general terms, the invention is based on the purpose of further increasing the productivity of ring spinning and ring twisting machines.

A winding and twisting device for a ring spinning or ring twisting machine according to the invention comprises: a stator comprising a superconducting material, a stator cooling device, a rotor configured to generate a magnetic field, and a rotatable spindle, wherein the rotor and the stator are arranged co-axially to the spindle and wherein the rotor has a ring/traveler system mounted thereon.

As described in greater detail below, the rotor can comprise at least subsections with a permanent-magnetic material that generate a magnetic field. This means that the rotor is magnetized at least in sections or that it has one or more permanent magnets. The magnetized sections or permanent magnets are formed as annular subsections, i.e. rotationally symmetric with respect to the axis of rotation of the rotor, to generate a rotationally symmetric magnetic field. Other subsections of stator and rotor may be made of other, e.g. non-magnetic materials. To facilitate the levitation of the rotor, in particular materials that reduce the weight of the rotor may be used.

To enable the formation of a superconducting state in at least a portion of the stator, the stator comprises at least one superconducting material or is made of at least one superconducting material such that at least one superconducting section is formed in the stator when cooling the stator to temperatures below the transition temperature of the superconducting material. The stator is formed and arranged to allow the magnetic flux of the rotor to enter said stator, and there is provided a stator cooling device for cooling the stator.

This stator cooling device is configured to create low temperatures, which are required for the formation of the superconducting state of the superconducting material, and is formed in a way that it can reduce the temperature in the superconducting areas of the stator until it falls below the transition temperature of the superconducting material.

In a variant of the invention, the cooling device may be formed as a bath cryostat, which may be filled with liquid nitrogen if high-temperature superconductors with transition temperatures above 77 K are used, wherein also other cryostats such as vaporization cryostats, in which cooling takes place by means of cold gas, or refrigerator cryostats, for which no cryoliquid is necessary, may be used in other variants. Through different combinations of multiple cooling devices, which differ in taking advantage of different physical effects for the generation of low temperatures, said cryostats can also be interconnected redundantly in order to increase the reliability of the system. In this context, the at least one superconducting material can be surrounded and/or coated by an appropriate thermal insulation to minimize cooling losses, which can be formed as part of the stator cooling device.

The rotor and the stator may be formed and arranged in a way that the rotor can be positioned in a contactless way due to magnetic levitation during the operation. This shall be understood as the support of the rotor being free-floating and hence contactless after cooling down of the superconducting areas of the stator.

By maintaining an optimal distance of those delimiting areas of the rotor and the stator, that face one another, and through the pinning of the flux tubes of the inhomogeneous magnetic field generated by the rotor permeating the stator when reducing the temperature of the superconducting material below its transition temperature, an inherently stable, passive support of the rotor is possible both without as well as with rotation of the rotor.

Therefore, complex control and/or sensor units for active bearing control of the rotor can be omitted. The absence of wear is ensured through the optimal distance, which results in a high reliability and robustness. Thanks to the contactless support of the rotor, an almost friction free rotation can be induced by the circulating yarn as driven by the rotation of the spindle. As a consequence, the rotation velocities of the thread and the spindle can be increased significantly, which, in turn, leads to a drastic productivity increase in connection with a possible increase of the diameter of the bobbin.

The inherently stable, passive support of the rotor results from an equilibrium of the restoring forces caused by changes of the position and orientation and the pinning forces of the flux tubes to the superconducting material of the stator.

In particular, the rotor may have one or more annular subsections with a permanent-magnetic material that create a rotationally symmetric magnetic field with respect to the axis of rotation of the rotor. The one or more subsections may in particular be formed as one or more annular permanent magnets co-axially arranged to the spindle axis. In addition, the rotor may have one or more non-magnetic segments that may be formed in a particularly light way in order to facilitate levitation. The non-magnetic segments may or may not be formed in an annular shape. By way of example, a non-magnetic reinforcement ring may be provided on the (radial) outside or inside of an annular permanent magnet as part of the rotor. An annular shape of the non-magnetic segments may be chosen to form an essentially imbalance-free rotor.

The stator may have one annular superconducting area or multiple superconducting subsections that are spaced in relation to one another in the circumferential direction of the spindle. Hence, the superconducting part does not necessarily have to extend over the whole circumference so that the stator cooling device can be significantly more compact and energy-saving. The superconducting subsections have a type II superconductor as a superconducting material. In one embodiment, these can be ceramic high-temperature superconductors from the group of the rare earth barium-copper oxides (RE)BaCuO or yttrium-barium-copper oxides (YBaCuO) or from the group of the bismuth-strontium-calcium-copper oxides (BiSrCaCuO). Furthermore, variants of the invention that have a superconducting material, which has an even higher transition temperature than the groups already mentioned, in the subsections of the stator are possible. Therefore, the performance parameters of the stator cooling device can be reduced, which leads to an increased energy efficiency of the described winding and twisting device. In this context, the superconducting subsections may be surrounded by a thermal insulation that is used to minimize cooling losses.

Segments of normally conductive and/or insulating materials may be arranged between the superconducting subsections. To save material, however, these intermediate segments may also be omitted completely. In particular, the superconducting subsections may be arranged at regular intervals in the periphery of the spindle, i.e. along a circle around the spindle axis. This allows for a particularly stable installation of the rotor. Alternatively, at least one annular superconducting area of the stator may be arranged co-axially to the spindle axis. To maximize the bearing force of the superconducting magnetic bearing, the rotor may comprise an annular permanent magnet and/or the stator may comprise an annular superconducting subsection co-axially arranged to the spindle axis. Furthermore, the annular permanent magnet and the annular superconducting subsection may be formed such that corresponding surfaces facing each other have essentially the same surface area.

According to an embodiment, the rotor and the stator may be arranged in a co-planar way with the stator enclosing the rotor. The terms "above" and "below" shall be understood here and in the following with regard to a ring spinning or ring twisting machine that stands on a mounting surface. The fiber material and/or the thread is usually guided from above to the bobbin that is wound up on the sleeve, in the process of which a so-called yarn balloon is formed due to the fast rotation of the thread. In the co-planar arrangement, the rotor is located inside of the stator when viewed in a radial direction. Viewed from inside in an outward direction, the arrangement may then look in particular as follows:
a) annular, i.e. ring-shaped, segment of the rotor with permanent-magnetic material,
b) annular support or reinforcement element of the rotor that encloses and supports the annular permanent magnet,
c) annular air gap, and
d) annular stator comprising at least one, in particular annular, superconducting segment/subsection.

According to an alternative embodiment, the rotor and the stator may be arranged in parallel at an axial distance to one another along the spindle axis. The terms "inside" and "outside" shall be seen in this disclosure in relation to the spindle axis. In the conventional arrangement where the yarn is guided to the bobbin from above, the rotor can be arranged in a way as to be located above the stator wherein the axial distance between the stator and the rotor is small enough as to enable the magnetic field of the rotor to enter the superconducting area of the stator. Due to the axial distance between the rotor and the stator, an air gap is formed between the rotor and the stator.

In either embodiment of the superconducting magnetic bearing, the rotor and the stator are co-axially arranged with respect to the spindle axis and each other.

The most relevant parameters specifying the quality of the above described superconducting magnetic bearings are the static bearing force and the stiffness against vertical and lateral displacement for the axially-shifted arrangement and against axial and radial displacement for the co-planar arrangement.

The co-planar arrangement has the advantage of a higher stiffness than the axially-shifted arrangement if a sufficiently long cylinder of superconducting material is used for the stator. The axially-shifted arrangement has the advantage of a simplified installation.

In either arrangement, the rotor has a substantial mass exhibiting a corresponding inertia during ramp-up and ramp-down of the spindle rotation.

According to the invention, the rotor has a ring/traveler system mounted thereon. In other words, a ring/traveler system comprising a ring and a traveler that is movably arranged on the ring is mechanically connected to the rotor. The ring/traveler system may be mounted on an upper surface of the rotor or, as described in more detail below, in mechanical contact with a radially inner part of the rotor. The ring/traveler system is mounted on the rotor such that the yarn can be guided, in particular from a balloon control ring, through the traveler of the ring/traveler system to the bobbin. Consequently, in a conventional arrangement, where the yarn is guided from above, the ring/traveler system may be mounted on the rotor in such a way that the traveler is provided above an upper surface of the rotor.

Mounting a ring/traveler system on a rotor that levitates through the superconducting magnetic bearing provides a number of advantages. During the ring spinning process, the traveler, the ring and the rotor are driven by the spindle rotation through the friction of the yarn with the traveler and the friction of the traveler with the ring that is attached to the rotor. As a result, twist is imparted to the yarn.

Due to the relatively low mass of the traveler as compared to the mass of the rotor, the traveler can react quickly to changes of the rotational speed of the spindle such as during ramp-up and ramp-down. However, friction and frictional heat exist between the ring and the traveler only during acceleration and deceleration phases, such as during piecing of the yarn, for a relatively short time, e.g. less than 10 seconds.

The frictional heat problem between ring and the traveler can be solved using a programmed control of the spindle that applies stepwise increments of the spindle speed (multi-speed), possibly together with multiple spindle-acceleration ramps, so that no critical heat generation at the traveler occurs during the acceleration phase. The programmed control of stepwise increments of the spindle speed allows the spindle to be gradually accelerated up to the targeted spindle speed. For each stepwise increment of the spindle speed, multiple acceleration ramps may be used as set value. This setting not only reduces the heat generation between ring and traveler during piecing of yarn but also prevents inconvenience occurrences such as flying out of traveler especially during acceleration time. Moreover, the traveler on the ring has enough time to adjust its speed to that of the spindle for each step of the spindle speed.

During normal operation, the rotor and the traveler rotate with nearly identical rotation frequencies such that the friction between the rotor and the traveler is reduced to almost 0. In addition, as the rotor rotates nearly free of friction due to the superconducting magnetic bearing, a significantly higher rotational speed of the rotor-ring/traveler assembly can be achieved in the winding and twisting device according to the present invention. As a result, the productivity of the inventive winding and twisting device can be increased.

Furthermore, as there is only friction between the ring and the traveler during acceleration of the spindle, the lifetime of the traveler is significantly extended as compared to the conventional ring/traveler systems. In addition, a high quality of the ringspun yarn can be guaranteed even at faster spindle rotations.

Finally, the piecing process of the yarn, in particular in the case of yarn breakage, can be performed without stopping the entire ring spinning or ring twisting machine even when the plurality of spindles are driven jointly as in the case of existing ring spinning machines. Therefore, the inventive winding and twisting device allows upgrading existing ring spinning machines with a superconducting magnetic bearing without the substantial investment cost of providing individual spindle drives.

The inventive winding and twisting device allows performing the piecing process of the yarn in a similar way as in a conventional ring spinning machine. During piecing, the traveler located on the ring starts to rotate synchronously with the ramp-up of the spindle rotation to impart the required twist in the yarn before the rotor starts rotating. In a short time, the friction between the traveler and the ring makes the rotor rotate with increasing angular speed until nearly matching the rotation frequency of the spindle. After reaching the final rotation frequency, there is almost no relative movement between the rotor, i.e. the ring, and the traveler such that almost no friction exists between the traveler and the ring. Thus, the inventive rotor-ring/traveler assembly minimizes the ramp-up time to match with that of conventional ring/traveler systems.

Due to the strongly reduced friction between the traveler and the ring during steady-state operation of the winding and twisting device of the present invention, the yarn tension is significantly reduced during the ring spinning process, thereby reducing the risk of yarn breakage and/or allowing for increased spindle rotation frequencies. As the friction between the traveler and the ring is reduced as compared to conventional ring/traveler systems from the very beginning of the ramp-up phase, due to the rotation of the rotor setting in, the yarn tension is further reduced during ramp-up of the spindle rotation as compared to conventional ring spinning machines. This improves reliability of the ring spinning machine and allows shortening the ramp-up time.

Similar considerations apply for a ramp-down of the spindle rotation, e.g. for yarn piecing.

According to one embodiment, the ring/traveler system may be releasably mounted on the rotor. By way of example, the ring/traveler system may be mounted on the rotor by locking, in particular positive locking, e.g., by means of a nut hub, a slot, a notch or the like, and/or frictional engagement, e.g. by screwing. Releasably mounting the ring/traveler system allows for a quick exchange of the ring/traveler system with a ring/traveler system of a different inner diameter of the trajectory of the traveler which is required for spinning different yarns. As the ring/traveler system is mounted on the rotor according to the present invention, the ring/traveler system is automatically centered with respect to the spindle axis as a result of the centering of the rotor. Consequently, it becomes very easy to exchange the ring/traveler system and thereby switch to a different yarn or yarn quality.

As described above, the rotor may comprise one or more, in particular annular, permanent magnets.

According to a further embodiment, the ring of the ring/traveler system may have a circular base part configured to be mechanically connected to an inner part of the rotor. In other words, a part of the rotor that is radially provided on the inside of the rotor is mechanically connected to a corresponding base part of the ring/traveler system having a circular cross-section. By way of example, a cylindrical part of the ring/traveler system may be provided as the circular base part wherein the cylindrical part is mechanically connected to a vertical inner part of the rotor such as a vertical inner surface of an annular-shaped rotor. Alternatively, the ring of the ring/traveler system may have a circular base part configured to be mechanically connected to an outer part of the rotor. However, a reduced yarn tension can be achieved when mechanically connecting the base part to an inner part of the rotor.

A circular base part configured to be mechanically connected to an inner part of the rotor allows automatically centering the ring/traveler system by connecting it to the rotor. Furthermore, a particularly lightweight ring/traveler system can be designed using such a circular base part.

According to a specific embodiment, the circular base part may be configured to be inserted into the inner part of the rotor. In other words, the circular base part may be configured to be inserted to be in contact with the inner part of the rotor by moving the circular base part along the axis of the rotor until in sufficient or full contact with the inner part of the rotor.

The circular base part may be configured to frictionally engage an inside of the inner part of the rotor. In other words, a design and/or surface property of the circular base part and/or a corresponding inside of the inner part of the rotor may be chosen so as to provide sufficient friction for a secure engagement during the ring spinning operation. By way of example, a cylindrical base part may be provided to frictionally engage a corresponding inner surface of the rotor.

Additionally or alternatively, the circular base part may be configured to engage an inside of the inner part of the rotor by positive locking. To this end, the base part and the inner part of the rotor may comprise interlocking elements such as, in particular axially arranged, protrusions and corresponding recesses. By way of example, tongues and corresponding grooves or key and corresponding slot may be arranged on an outer surface of the base part and the inner surface of the inner part, respectively, to provide a positive fit.

The circular base part may be deformable to fit inside the inner part of the rotor. In particular, the circular base part may be elastically deformable such that a maximum diameter of the base part, being slightly larger then a minimum diameter of the inner part of the rotor in an unconnected state, is reduced to match the diameter of the inner part of the rotor by deforming the base part, in particular by manually deforming the base part.

The circular base part may in particular, be provided with one or more, in particular axial, slots to be deformable. In other words, one or more, in particular axially arranged, i.e. vertical, slots are provided in the circular base part to allow for extra circumferential space to compress the circular base part for insertion into the inner part of the rotor. Axial slots may be provided along part of or the entire vertical extent of the circular base part, in particular reaching down to the rim of the circular base part. Alternatively or additionally, one or more circumferentially arranged slots, with or without circumferentially oriented lugs, may be provided for the necessary deformability of the circular base part.

A correspondingly formed circular base part may be easily inserted into and removed from the inner part of the rotor when exchanging the ring/traveler system, e.g. for switching to a different diameter of the trajectory of the traveler.

According to one embodiment, the circular base part may be configured to be press-fitted into the inner part of the rotor. To this end, the circular base part may have a cylindrical or slightly conical outer surface that is frictionally engaged with the inner part of the rotor by press-fitting the circular base part into the inner part of the rotor. Press-fitting the circular base part into the inner part of the rotor provides a highly convenient mechanism for quickly connecting the ring/traveler system to the rotor wherein the ring is automatically centered with respect to the spindle axis.

The ring of the ring/traveler system may comprise a conical part provided between the circular base part and a ring-shaped upper part on which the traveler is arranged. The conical part may be formed to transition from a diameter of the base part, that is configured to match the diameter of the inner part of the rotor, to a desired diameter of the trajectory of the traveler. Different diameters of the trajectory may be realized by changing the conical angle of the conical part, i.e. the slope of the conical part with respect to the cylindrical base part. Thus, different ring/traveler systems with different conical angles may be used to quickly change to a different yarn or yarn quality.

The ring may be non-magnetic, i.e. made of one or more non-magnetic materials. As a consequence, the ring does not interfere with the static bearing force of the superconducting magnetic bearing provided by the rotor-stator assembly.

The ring may in particular, be made of one or more non-ferromagnetic metals and/or alloys. Non-ferromagnetic materials are not magnetized when exposed to the magnetic field of a permanent magnet such as the one of the rotor.

According to a further embodiment, the traveler may be non-magnetic, i.e. made of one or more non-magnetic materials. As with the ring, a non-magnetic traveler does not interfere with the bearing force of the superconducting magnetic bearing. In particular, movement of the traveler along the ring is not obstructed by a magnetic interaction between the permanent magnet of the rotor and the traveler that might lead to an increased friction between the traveler and the ring.

The traveler may have a mass of less than 50 mg, preferably less than 20 mg. Using a lightweight traveler reduces both, the friction between the traveler and the ring and the remaining imbalance of the rotor-ring/traveler assembly. As a result, vibrations due to a residual imbalance are reduced.

According to a further embodiment, at least the part of the surface of the traveler that comes into contact with the thread may be coated. In particular, the whole traveler may be coated. In this context, the coating may be chosen in a way as to minimize the friction between the yarn and the traveler and between the traveler and ring. For example, the coating can have an average roughness value Ra (μm) in the range from Ra=0.025 (lapping) to Ra=0.5 (pre-grinding) according to DIN EN ISO 4287:2010-07. Alternatively, a coating of the traveler may be chosen such that the kinetic friction coefficient μ is smaller than 0.1, preferably smaller than 0.05.

Furthermore, the traveler may be made of a plastic material or a light metal or comprise a plastic material and/or light metal.

According to a further embodiment, the stator can be held by a holding device of the winding and twisting device, with said holding device being formed with a fixed position and with the spindle with the bobbin being able to move axially in relation to the fixed stator, i.e. along the spindle axis in order to wind up the yarn onto the bobbin. In another embodiment of the invention, however, the spindle with the bobbin is fixed and the stator holding device is connected to a stator displacing device so that the winding and twisting device for ring spinning and ring twisting machines can move axially in relation to the spindle and the bobbin, i.e. along the spindle axis.

As for the stator holding device, a radial distance between the bobbin and the inner radial delimiting area of the stator or rotor, depending on which one has the smaller radius, shall be maintained. To keep the air resistance created by the yarn balloon constant during the period of winding the yarn or twist onto the bobbin, it is possible for the embodiment with a moving winding and twisting device to arrange the yarn guide on the upper end of the yarn balloon in a way that it is fixedly connected to the stator holding device or that it is fastened directly on the stator so that the yarn guide can be displaced in the axial direction together with the winding and twisting device. As a result, the distance of the yarn guide from the rotor, and consequently the expansion of the yarn balloon, remains constant during the winding process.

The present disclosure further provides a ring spinning or ring twisting machine that comprises a plurality of winding and twisting devices according to any one of the above described embodiments, and a spindle drive system configured to collectively drive the spindles of the plurality of winding and twisting devices.

Such a ring spinning or ring twisting machine may have more than 100, potentially more than 1000 winding and twisting devices according to one of the above-described embodiments. A spindle drive system may be provided as known in the art in combination with the winding and twisting devices as described in the present disclosure. In particular, a belt drive may be used to drive the plurality of spindles with a single drive motor.

BRIEF DESCRIPTION OF THE FIGURES

Further features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

DETAILED DESCRIPTION

In the figures, identical reference signs indicate identical or similar components.

Figure 2:
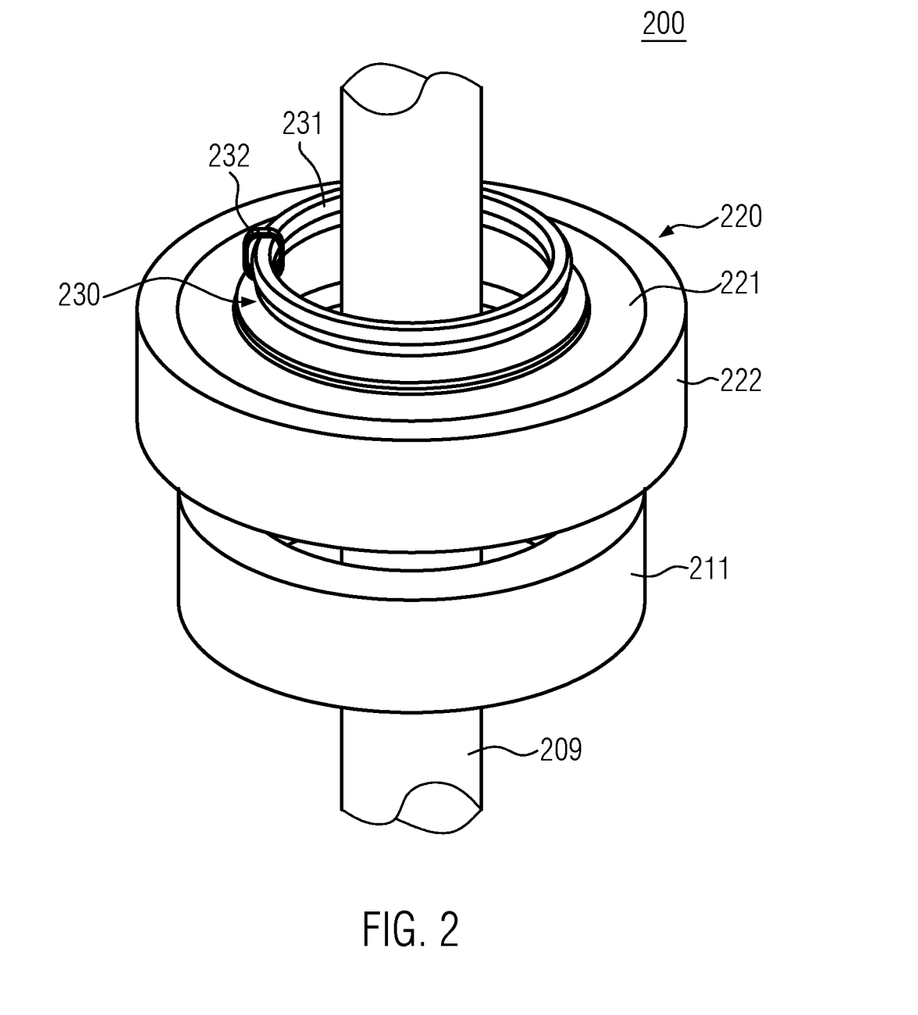
FIG. 2 shows a schematic three-dimensional view of a winding and twisting device according to the present invention.

FIG. 2 shows a schematic three-dimensional view of a winding and twisting device according to the present invention. The representation in FIG. 2 is simplified to demonstrate the principle of the present invention without being limiting in terms of a specific embodiment. The vertical axis of the winding and twisting device 200 is indicated by the bobbin 209 shown here as a cylinder.

An annular superconducting element 211 of the stator and the annular-shaped rotor 220 are co-axially arranged with respect to the spindle axis. The depicted, nonlimiting embodiment shows an axially-shifted arrangement of the stator and the rotor 220. The rotor 220 comprises an annular permanent magnet 221 with the same radial extent as the superconducting element 211 of the stator, shifted along the spindle axis to provide an air gap between the stator and the rotor during operation. The rotor 220 further comprises an optional annular reinforcement element 222 shown here to surround the permanent magnet 221 in a circumferential direction. The annular reinforcement element may give stability to the permanent magnet and may further include or be made of an electrically conducting material. A rotational speed control device 256 may be provided at a side of the annular reinforcement element to induce eddy currents in the electrical conducting material to actively influence the rotational speed of the rotor 220 by braking.

In the depicted, nonlimiting embodiment, a ring/traveler system 230 according to the present invention is inserted into the inner diameter of the annular permanent magnet 221 to frictionally engage an inner surface of the rotor 220. It is understood that alternatively or additionally a reinforcement element may be provided on the inside of the annular permanent magnet 221 that frictionally engages the ring/traveler system 230.

In FIG. 2, the ring/traveler system 230 is mounted on the rotor 220 by inserting it into an inner diameter of the rotor. It is, however, understood that the ring/traveler system may be mounted on the rotor 220 by other mechanical means such as locking or screwing, in particular by releasably mounting the ring/traveler system on the rotor.

The ring/traveler system 230 itself comprises a ring 231 and a traveler 232 movably mounted on the ring 231. A cross-section of the ring 231 may be chosen so as to allow for free movement of the traveler 232 along the circumference of the ring during operation of the ring spinning machine wherein the traveler is taken along by the thread guided through the traveler due to the rotation of the spindle as generally known. As described above, both, the ring 231 and the traveler 232 may be made of non-magnetic materials to avoid interference with the magnetic field generated by the annular permanent magnet 221.

Figure 3:
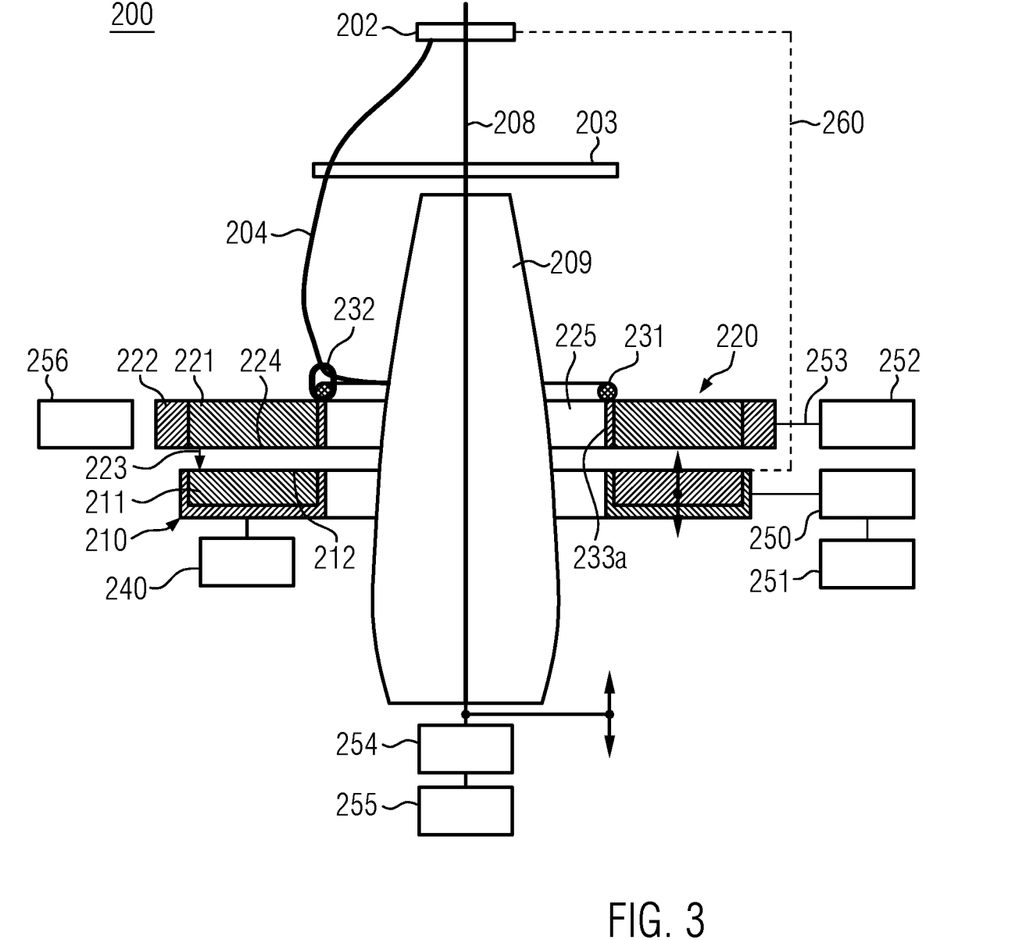
FIG. 3 shows a schematic representation of a winding and twisting device according to the present invention.

A more detailed view of the winding and twisting device 200 is shown as a cross-sectional side view in FIG. 3. Again, the bobbin 209 and the spindle axis 208 are schematically indicated in FIG. 3. The spindle 208 is held by a spindle holding device and made rotate by a spindle rotating device 254. As mentioned above, an individual spindle drive may be used as the spindle rotating device 254. Alternatively, a plurality of spindles may be rotated jointly by means of a joint spindle drive, e.g. using a belt. The yarn runs through the yarn guide 202 and continues through the balloon control ring 203 and the traveler 232 in order to be wound up onto the bobbin 209. As the yarn is guided through the traveler 232, rotation of the spindle 208 carries the traveler 232 along the ring 231 of the ring/traveler system 230 according to the present invention. As described above, the initial friction between the circulating traveler 232 and the surface of the ring 231 spins up the entire rotor 220 during ramp-up of the ring spinning machine. After reaching the terminal rotation frequency of the rotor, almost no relative movement between the traveler 232 and the rotor 220, i.e. the ring 231, remains such that friction between the traveler and the ring is reduced to nearly 0. This reduction of the friction results from the nearly frictionless support of the rotor 220 by the superconducting magnetic bearing of the stator 210.

The frictional heat problem between ring and the traveler can be solved using a programmed control of the spindle that applies stepwise increments of the spindle speed (multispeed), possibly together with multiple spindle-acceleration ramps, so that no critical heat generation at the traveler occurs during the acceleration phase. The programmed control of stepwise increments of the spindle speed allows the spindle to be gradually accelerated up to the targeted spindle speed. For each stepwise increment of the spindle speed, multiple acceleration ramps may be used as set value. This setting not only reduces the heat generation between ring and traveler during piecing of yarn but also prevents inconvenience occurrences such as flying out of traveler especially during acceleration time. Moreover, the traveler on the ring has enough time to adjust its speed to that of the spindle for each step of the spindle speed. The remaining difference in the rotation frequencies between the rotor 220 and the spindle 208 as well as the air friction of the yarn balloon 204, that is formed, wind up the yarn onto the bobbin 209 while the circulation of the yarn balloon 204 imparts the desired twist to the yarn.

As in FIG. 2, the rotor 220 is shifted in an axial direction relative to the stator 210. The stator 210 that comprises at least one superconducting material 211, shown in FIG. 3 as an annular superconducting element by way of example, is arranged co-axially to the spindle and/or spindle axis 208 and is cooled down below the transition temperature of the superconducting material 211 by the stator cooling device 240. The stator 210 that is disposed below the rotor 220 in this exemplary development is held by a stator holding device 250 that is indicated only schematically. In the exemplary embodiment of FIG. 3, the stator 210 comprises, in addition to the annular superconducting element 211, an insulating element at least partially encasing the superconducting elements to provide heat insulation against the environment.

Figure 5:
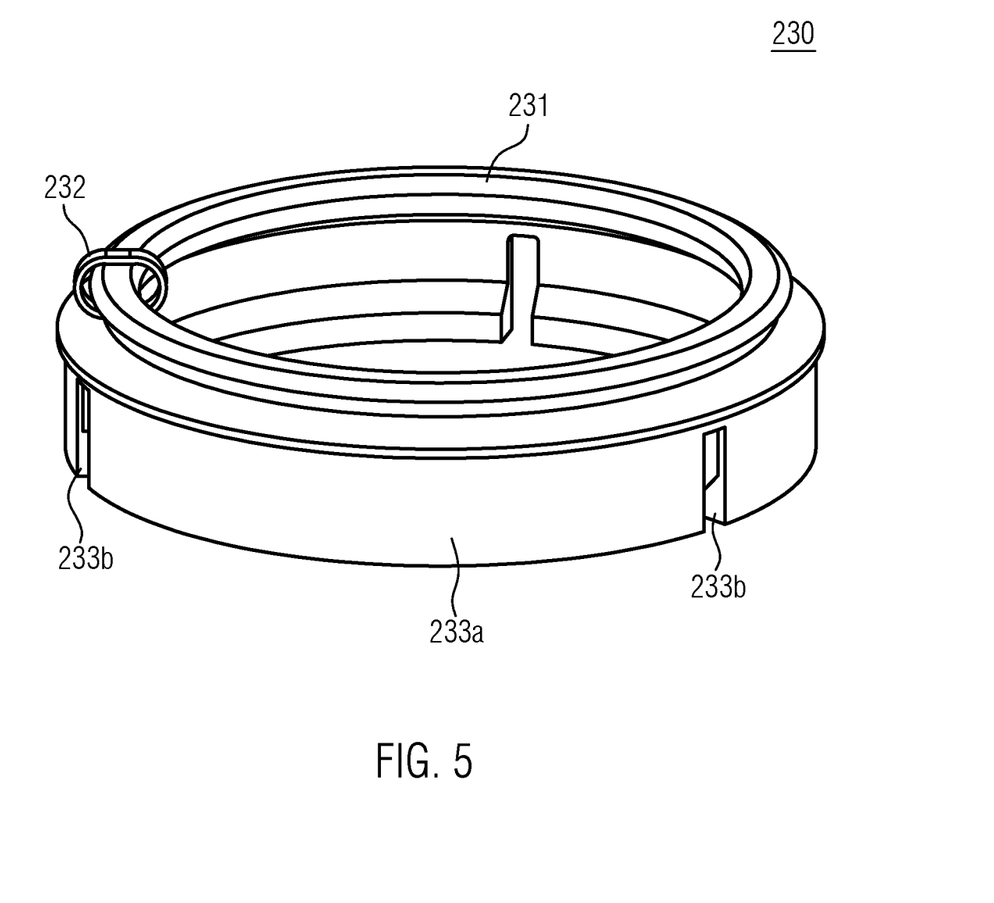
FIG. 5 shows a three-dimensional view of a ring/traveler system according to the present invention.

As described with respect to FIG. 2, the rotor 220 may include an annular permanent magnet 221 and an annular reinforcement element 222 that circumferentially surrounds and supports the permanent magnet 221. Furthermore, an inner part, more specifically a vertically arranged inner surface 225, of the rotor 220 is shown in the figures. The inner surface 225 frictionally engages a cylindrical base part 233*a* of the ring/traveler system 230 after inserting the base part into the inner part of the rotor. As described above, the cylindrical base part is 233*a* may be provided with a slightly larger outer diameter than the inner diameter of the inner part 225 of the rotor and be deformable so as to be insertable into the inner part of the rotor. A specific, nonlimiting embodiment of the base part 233*a* is shown in FIG. 5.

According to the exemplary embodiment of FIG. 3, the rotor 220 and the stator 210 are arranged in parallel and at an axial distance to one another so that they are not in contact with each other and that the magnetic field created by the annular permanent magnets 221 of the rotor can enter the superconducting material 211 of the stator 210. A ring-shaped channel 223 is formed between a lower surface 224 of the rotor 220 and an upper surface 212 of the stator 210 while the rotor 220 levitates through the pinning of the magnetic flux in the superconducting elements 211 of the stator 210. This air gap between the rotor 220 and the stator 210 is maintained during operation due to the superconducting magnetic bearing force even when moving the stator 210 up and down as indicated in the figures.

For a startup and shutdown of the winding and twisting device 200, the rotor 220 is held co-axially at a distance to the stator 210 by a rotor holding device 252, the temperature of the superconducting element 211 is lowered below the transition temperature of the superconducting material and the rotor 220 is subsequently released by the rotor holding device 252. For this purpose, the schematically displayed mechanical connection 253 can be retracted during operation.

For winding up the yarn onto the bobbin 209, the stator holding device 250 is displaced in a variant of the invention along the spindle axis by means of a stator displacing device 251 wherein the yarn guide 202 and optionally the balloon control ring 203 may be moved along by means of an optional rigid connection 260 (indicated schematically) while the spindle does not change its position relative to the ring spinning machine. In another variant of the invention, the position of the winding and twisting device relative to the ring spinning machine remains fixed while the spindle 208 with the bobbin 209 is displaced along the spindle axis by means of the spindle displacement device 255.

Figure 4A:
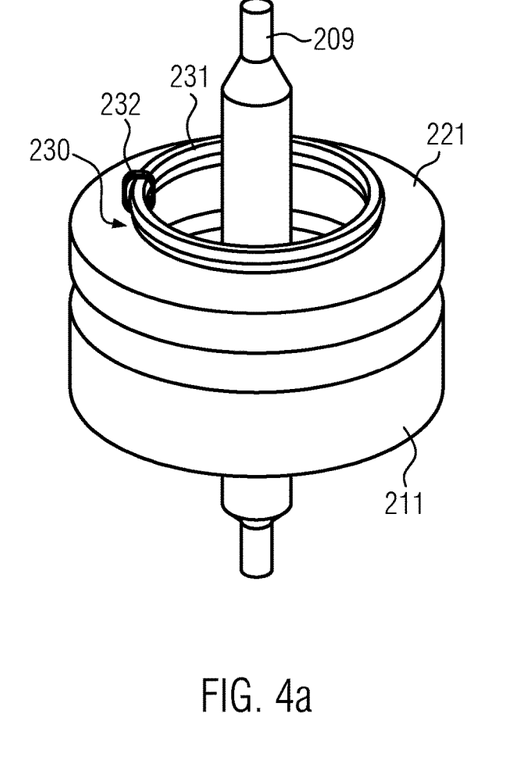
FIGS. 4a-4b show three-dimensional views of two alternative configurations of a winding and twisting device according to the present invention.
Figure 4B:
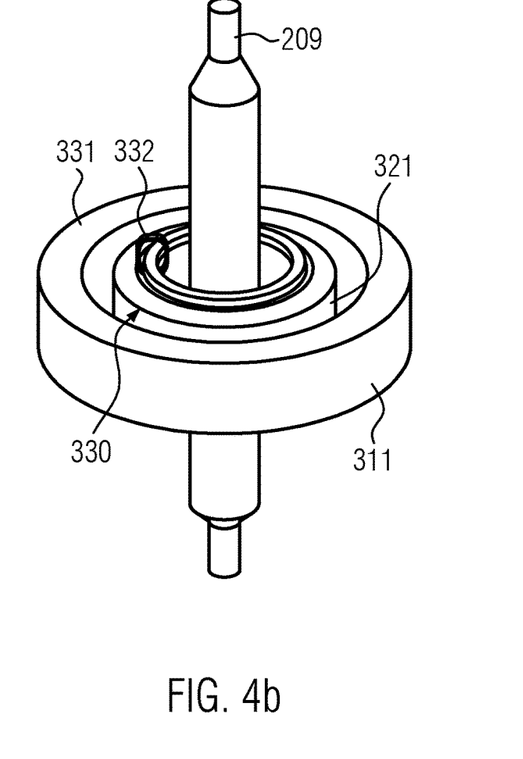

FIGS. 4*a*-4*b* show three-dimensional views of two alternative configurations of a winding and twisting device according to the present invention. The configuration shown in FIG. 4*a* corresponds to the configuration shown in FIGS. 2 and 3 where the rotor 220, shown here as the annular permanent magnet 221, is vertically shifted with respect to the stator 210, shown here as the superconducting element 211. Both, the permanent magnet 221 and the superconducting element 211 are co-axially arranged with respect to the spindle axis represented by the bobbin 209. As in FIG. 2, a ring/traveler system 230 including a ring 231 and a traveler 232 is mounted on the rotor 220, in particular by inserting a circular base part of the ring into an inner diameter of the rotor. As a consequence, the ring 231 rotates synchronously together with the rotor 220 while the traveler 232 provides the additional flexibility needed for a fast ramp-up and ramp-down, e.g. for a piecing process.

An alternative embodiment is shown in FIG. 4*b* wherein the rotor and the stator are arranged co-planarly, i.e. in the same horizontal plane. As in the configuration according to FIG. 4*a*, the rotor and the stator are co-axially arranged with respect to the spindle axis. Again, a ring/traveler system 330 including a ring 331 and a traveler 332 is mounted on the rotor, shown here as the annular permanent magnet 321, e.g. by frictional engagement between a circular base part of the ring 331 and an inner surface of the permanent magnet 321 or by means of a nut hub.

As mentioned above, the co-planar arrangement of FIG. 4*b* has a higher stiffness than the axially-shifted arrangement of FIG. 4*a* if a sufficiently long cylinder of superconducting material 311 is used for the stator. In contrast, the axially-shifted arrangement of FIG. 4*a* has the advantage of a simplified installation. The inventive ring/traveler system may be mounted on the rotor of either embodiment wherein the arrangement according to FIG. 4*a* provides for a more compact arrangement in terms of the gauge of neighboring spindles based on identical inner diameters of the trajectories of the travelers (depending on the desired yarn quality).

FIG. 5 shows a schematic three-dimensional view of the ring/traveler system 230 according to a particular embodiment of the present disclosure. As described above, the ring/traveler system 230 comprises a ring 231 and a traveler 232 that is movably arranged on the ring. Shape and cross-section of the ring 231 and the traveler 232 may be selected according to the desired yarn quality and remnant friction between the ring and traveler.

According to the exemplary embodiment of FIG. 5, the ring/traveler system 230 has a circular base part 233*a* configured to be inserted into an inner part of the rotor. To be easily and releasably mountable on the rotor, the specific base part 233*a* is provided with a plurality of axial, i.e. vertical, slots 233*b* that allow slightly deforming the base part during insertion into the inner part of the rotor. In other words, the base part 233*a* is provided with a slightly larger diameter than the inner diameter of the inner part of the rotor 220 wherein the slots 233*b* allow reducing the diameter of the base part by manual deformation to insert the base part into the inner part of the rotor. Alternative embodiments can be thought of and are included in the present disclosure. By way of example, one or more circumferentially arranged slots, with or without corresponding lugs, may be provided to allow deforming the base part for insertion into the inner part of the rotor.

Figure 6:
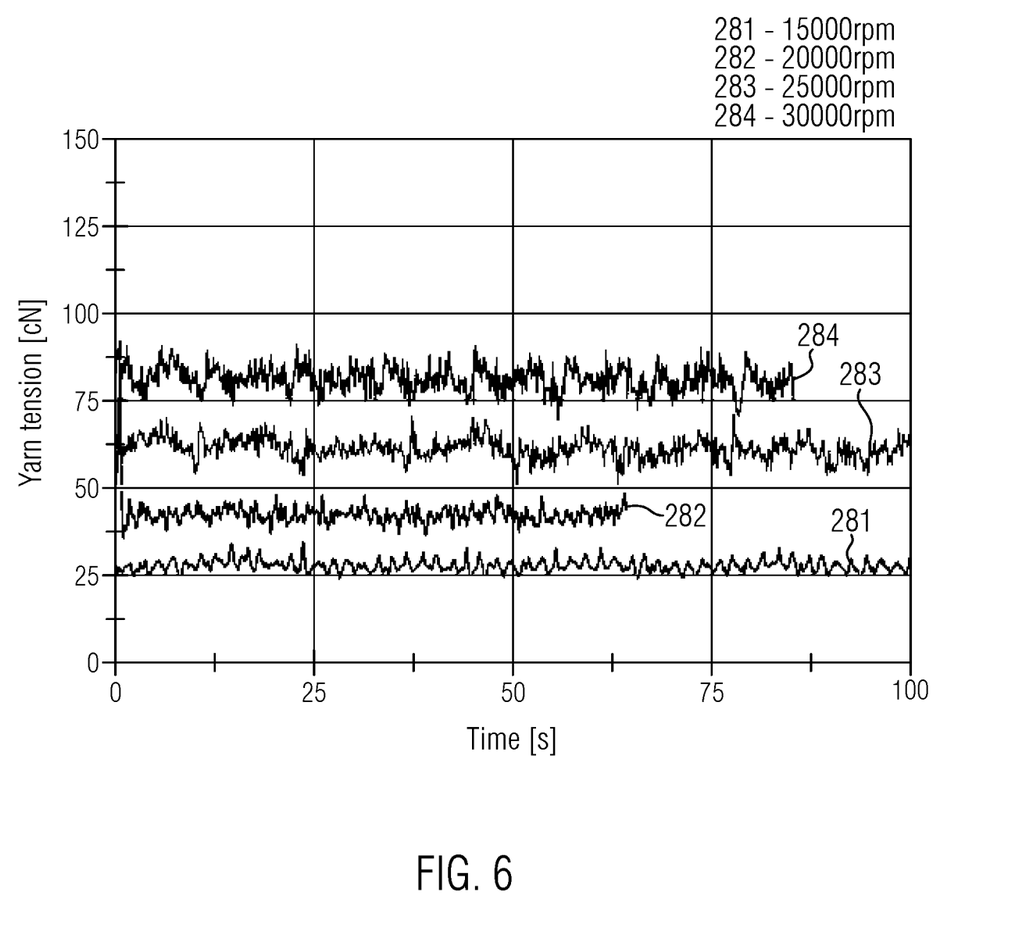
FIG. 6 shows measurements of the yarn tension for a winding and twisting device according to the present invention.

FIG. 6 shows measurements of the yarn tension for a winding and twisting device according to the present invention. FIG. 6 shows four curves 281 to 284 reflecting experimental results for the yarn tension in cN versus time. The four curves in FIG. 6 show the yarn tension for angular spindle speeds of 15,000 rpm, 20,000 rpm, 25,000 rpm, and 30,000 rpm, respectively. As can be seen from FIG. 6, the yarn tension increases almost linearly with the rotation frequency of the spindle. More importantly, a significantly higher rotation frequency, up to 30,000 rpm, was achieved using the inventive winding and twisting device due to the significantly reduced friction between the traveler and the ring. Thus, the yarn tension can be reduced by up to 50% in comparison to that of conventional ring spinning process. Furthermore, yarn tension peaks in the conventional ring spinning systems can be avoided by using the inventive ring/traveler system.

Furthermore, mounting the inventive ring/traveler system on a levitating rotor allows performing the conventional piecing process, e.g. in case of yarn breakage. In addition, the above described embodiments for releasably mounting the ring/traveler system on the rotor, significantly reduce the changeover time for changing to a different yarn and/or different yarn quality. Moreover, the quick changes of yarn tension, i.e. the yarn tension variation during each cycle of ring rail movement, can be adjusted along with the smooth running of rotating magnet without vibration using the inventive ring/traveler system on the magnet.

The invention claimed is:

1. A winding and twisting device for a ring spinning or ring twisting machine, comprising:
   a stator comprising a superconducting material,
   a stator cooling device,
   a rotor configured to generate a magnetic field, and
   a rotatable spindle,
   wherein the rotor and the stator are arranged co-axially to the spindle;
   wherein the rotor has a ring/traveler system mounted thereon.

2. The winding and twisting device according to claim 1, wherein the ring/traveler system is releasably mounted on the rotor.

3. The winding and twisting device according to claim 2, wherein the ring/traveler system is mounted on the rotor by locking and/or frictional engagement.

4. The winding and twisting device according to claim 1, wherein the rotor comprises a permanent magnet.

5. The winding and twisting device according to claim 1, wherein the ring of the ring/traveler system has a circular base part configured to be mechanically connected to an inner part of the rotor.

6. The winding and twisting device according to claim 1, wherein the ring of the ring/traveler system has a circular base part configured to be mechanically connected to an inner part of the rotor and wherein the circular base part is configured to be inserted into the inner part of the rotor.

7. The winding and twisting device according to claim 1, wherein the ring of the ring/traveler system has a circular base part configured to be mechanically connected to an inner part of the rotor and wherein the circular base part is configured to frictionally engage an inside of the inner part of the rotor.

8. The winding and twisting device according to claim 1, wherein the ring of the ring/traveler system has a circular base part configured to be mechanically connected to an inner part of the rotor and wherein the circular base part is deformable to fit inside the inner part of the rotor.

9. The winding and twisting device according to claim 1, wherein the ring of the ring/traveler system has a circular base part configured to be mechanically connected to an inner part of the rotor and wherein the circular base part is provided with one or more slots to be deformable.

10. The winding and twisting device according to claim 1, wherein the ring of the ring/traveler system has a circular base part configured to be mechanically connected to an inner part of the rotor and wherein the circular base part is configured to be press-fitted into the inner part of the rotor.

11. The winding and twisting device according to claim 1, wherein the ring/traveler system is releasably mounted on the rotor, the ring of the ring/traveler system is non-magnetic.

12. The winding and twisting device according to claim 1, wherein the ring/traveler system is releasably mounted on the rotor, the ring of the ring/traveler system is non-magnetic and is made of one or more non-ferromagnetic metals and/or alloys.

13. The winding and twisting device according to claim 1, wherein the ring/traveler system is releasably mounted on the rotor and the traveler of the ring/traveler system is non-magnetic.

14. The winding and twisting device according to claim 1, wherein the ring/traveler system is releasably mounted on the rotor and the traveler of the ring/traveler system has a mass of less than 50 mg.

15. A ring spinning or ring twisting machine, comprising:
a plurality of winding and twisting devices according to claim 1, and
a spindle drive system configured to collectively drive the spindles of the plurality of winding and twisting devices.

* * * * *